(12) United States Patent
Gregorio et al.

(10) Patent No.: US 7,405,729 B2
(45) Date of Patent: *Jul. 29, 2008

(54) SYSTEMS AND METHODS FOR USER INTERFACES DESIGNED FOR ROTARY INPUT DEVICES

(75) Inventors: Pedro Gregorio, Verdum (CA); Henry DaCosta, Montreal (CA); Herve Thu Timone, La Prairie (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/489,771

(22) Filed: Jul. 20, 2006

(65) Prior Publication Data
US 2006/0256098 A1   Nov. 16, 2006

Related U.S. Application Data

(63) Continuation of application No. 10/830,764, filed on Apr. 23, 2004, now Pat. No. 7,116,317.

(60) Provisional application No. 60/466,284, filed on Apr. 28, 2003.

(51) Int. Cl.
   *G09G 5/00* (2006.01)
(52) U.S. Cl. ..................... 345/184; 345/156
(58) Field of Classification Search ............ 345/156, 345/184; 715/810, 829, 830; 341/35
   See application file for complete search history.

(56) References Cited

U.S. PATENT DOCUMENTS

| | | | |
|---|---|---|---|
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,902,687 A | 9/1975 | Hightower | |
| 3,903,614 A | 9/1975 | Diamond et al. | |
| 4,160,508 A | 7/1979 | Frosch et al. | |
| 4,236,325 A | 12/1980 | Hall et al. | |
| 4,513,235 A | 4/1985 | Acklam et al. | |
| 4,581,491 A | 4/1986 | Boothroyd | |

(Continued)

FOREIGN PATENT DOCUMENTS

EP          0349086          1/1990

(Continued)

OTHER PUBLICATIONS

Adelstein, "A Virtual Environment System For The Study of Human Arm Tremor," Ph.D. Dissertation, Dept. of Mechanical Engineering, MIT, Jun. 1989.

(Continued)

*Primary Examiner*—Ricardo L Osorio
(74) *Attorney, Agent, or Firm*—Kilpatrick Stockton LLP

(57) ABSTRACT

Systems and methods for providing visual navigation cues in user interfaces for use with rotary input devices are described. One described method comprises causing a plurality of graphical objects to be displayed in an arc. The curvature of the arc is configured to convey the ordinal relationship for navigating between each of the plurality of graphical objects with a rotary input device. The curvature of the arc is independent of the spatial relationship between the rotary input device and a display.

6 Claims, 9 Drawing Sheets

U.S. PATENT DOCUMENTS

| | | | |
|---|---|---|---|
| 4,599,070 A | 7/1986 | Hladky et al. | |
| 4,708,656 A | 11/1987 | de Vries et al. | |
| 4,713,007 A | 12/1987 | Alban | |
| 4,891,764 A | 1/1990 | McIntosh | |
| 4,930,770 A | 6/1990 | Baker | |
| 4,934,694 A | 6/1990 | McIntosh | |
| 5,019,761 A | 5/1991 | Kraft | |
| 5,022,407 A | 6/1991 | Horch et al. | |
| 5,035,242 A | 7/1991 | Franklin | |
| 5,038,089 A | 8/1991 | Szakaly | |
| 5,078,152 A | 1/1992 | Bond | |
| 5,186,695 A | 2/1993 | Mangseth et al. | |
| 5,212,473 A | 5/1993 | Louis | |
| 5,240,417 A | 8/1993 | Smithson et al. | |
| 5,271,290 A | 12/1993 | Fischer | |
| 5,275,174 A | 1/1994 | Cook | |
| 5,299,810 A | 4/1994 | Pierce | |
| 5,309,140 A | 5/1994 | Everett | |
| 5,334,027 A | 8/1994 | Wherlock | |
| 5,466,213 A | 11/1995 | Hogan | |
| 5,547,382 A | 8/1996 | Yamasaki | |
| 5,559,944 A * | 9/1996 | Ono | 715/841 |
| 5,766,016 A | 6/1998 | Sinclair | |
| 5,785,630 A | 7/1998 | Bobick et al. | |
| 5,943,039 A * | 8/1999 | Anderson et al. | 715/810 |
| 5,986,638 A * | 11/1999 | Cheng | 715/857 |
| 6,028,600 A | 2/2000 | Rosin et al. | |
| 6,034,688 A | 3/2000 | Greenwood et al. | |
| 6,111,577 A | 8/2000 | Zilles et al. | |
| 6,219,034 B1 | 4/2001 | Elbing et al. | |
| 6,348,772 B1 | 2/2002 | May | |
| 6,404,420 B1 | 6/2002 | Klein et al. | |
| 6,422,941 B1 | 7/2002 | Thorner et al. | |
| 6,468,212 B1 | 10/2002 | Scott et al. | |
| 6,483,500 B1 | 11/2002 | Choi et al. | |
| 6,614,456 B1 | 9/2003 | Rzepkowski et al. | |
| 2001/0034218 A1 | 10/2001 | Hudecek et al. | |
| 2002/0072674 A1* | 6/2002 | Criton et al. | 600/454 |
| 2003/0043206 A1* | 3/2003 | Duarte | 345/810 |
| 2004/0076444 A1* | 4/2004 | Badovinac et al. | 399/81 |

FOREIGN PATENT DOCUMENTS

| | | |
|---|---|---|
| EP | 0626634 | 11/1994 |
| JP | H2-185278 | 7/1990 |
| JP | H4-838 T | 1/1992 |
| JP | H5-192449 | 8/1993 |
| JP | H7-24147 | 1/1995 |
| WO | WO 02/39712 | 5/2002 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings Of Fourth CISM-IFToMM, Sep. 8-12, 1981.

Bejczy, et al., "Universal Computer Control System (UCCS) For Space Telerobots," CH2413-3/87/0000/0318501.00 1987 IEEE, 1987.

Bejczy et al., "A Laboratory Breadboard System For Dual-Arm Teleoperation," SOAR '89 Workshop, JSC, Houston, TX, Jul. 25-27, 1989.

Brooks et al., "Hand Controllers for Teleoperation—A State-of-the-Art Technology Survey and Evaluation," JPL Publication 85-11; NASA-CR-175890: N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93. pp. 955-960, 1993.

"Cyberman Technical Specification," Logitech Cyberman Swift Supplement, Apr. 5, 1994.

Eberhardt et al., "OMAR—A Haptic display for speech perception by deaf and deaf-blind Individuals," IEEE Virtual Reality Annual International Symposium, Seattle, WA, Sep. 18-22, 1993.

Eberhardt et al., "Including Dynamic Haptic Perception by The Hand: System Description and Some Results," DSC-vol. 55-1, Dynamic Systems and Control: vol. 1, ASME 1994.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

McAffee, "Teleoperator Subsystem/Telerobot Demonstator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouh-Young, "Force Display in Molecular Docking," Order No. 9034744, p. 1-369, 1990.

Ouh-Young et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick et al., "Design and Testing of A Non-reactive, Fingertip. Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," 2nd Edition; McGraw-Hill, ISBN 0-07-050167-X, pp. 41-202, 1994.

Rabinowitz et al., "Multidimensional tactile displays: Identification of vibratory intensity, frequency. and contactor area," Journal of The Acoustical Society of America, vol. 82, No. 4, Oct. 1987.

Russo, "The Design and Implementation of a Three Degree of Freedom Force Output Joystick," MIT Libraries Archives Aug. 14, 1990, pp. 1-131, May 1990.

Russo, "Controlling Dissipative Magnetic Particle Brakes in Force Reflective Devices," DSC-vol. 42, Advances in Robotics, pp. 63-70, ASME 1992.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC-vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-86, Feb. 1990.

Terry et al., "Tactile Feedback In A Computer Mouse," Proceedings of Fourteenth Annual Northeast Bioengineering Conference, University of New Hampshire, Mar. 10-11, 1988.

* cited by examiner

SYSTEMS AND METHODS FOR USER INTERFACES DESIGNED FOR ROTARY INPUT DEVICES

CROSS-REFERENCES TO RELATED APPLICATION

This application is a continuation of U.S. patent application Ser. No. 10/830,764, entitled "Systems and Methods for User Interfaces Designed for Rotary Input Devices," filed Apr. 23, 2004, now U.S. Pat. No. 7,116,317 which claims priority to U.S. Provisional Application No. 60/466,284, filed Apr. 28, 2003, all of which are herein incorporated by reference.

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE INVENTION

The present invention generally relates to user interface design. The present invention more particularly relates to design of user interfaces for use with rotary input devices.

BACKGROUND

Rotary inputs, such as knobs, are common in a multitude of everyday devices. Historically, rotary inputs have been mechanically linked to the component they control. Any indication of the current setting was provided by markings on the housing of the device where the rotary input is installed.

For example, in a conventional analog radio, the volume control includes a knob with alignment markings on the front panel of the radio. When the knob is rotated, alignment of a mark on the knob with one of the marks on the panel indicates the volume setting. In such a configuration, it is obvious to the user of the radio how to increase the volume; typically, clockwise rotation of the knob increases the volume.

The configuration of the rotary input in a conventional digital device may be different than the configuration of an analog device. For example, many conventional digital electronic devices, such as those found in homes, automobiles, and portable devices, include a display for displaying the state of the device. The display includes information corresponding to the position of the rotary input device. In such a device, the knob's location relative to the display provides the user with an indication of which direction to turn the knob to increment a setting. For example, in an automotive radio with a conventional digital display the fader control is typically represented by a bar graph with the front of the car to the left and the rear to the right. The middle of the graph represents an equal balance between the front and rear speakers of the car. The bar graph is typically located above the knob so that by turning the knob clockwise, the signal and the corresponding bar graph is shifted towards the rear of the car. If the spatial relationship between the control and the display is not well designed, the direction that the user is supposed to turn the input may be ambiguous, i.e., the user will be unsure whether to turn the rotary input clockwise or counter clockwise to select the next item in a list.

In one conventional interface design, a virtual knob displayed in the interface provides the user with a visual cue regarding how to move the physical knob located on the console. The physical knob is vertically aligned with and located below the screen and is turned based on the representation shown on the screen, i.e., a clockwise motion implies leftward movement; a counterclockwise motion implies a rightward movement. While this combination provides an intuitive interface, it also requires a large display in order to display both the menu items and the virtual knob. In some sections of the interface, the virtual knob is not displayed. If the knob is placed below (or above) the display, the position of the knob indicates which direction to turn the knob to select form a horizontal list; if the knob is placed beside the display, the position indicates which direction to turn the knob for a vertical list. However, if the knob is placed below (or above) the display, it is unclear in which direction to turn the knob to select from a vertical list. Similarly, if the knob is placed next to the display, it in unclear in which direction to turn the knob to select from a horizontal list.

As electronic devices continue to evolve, the complexity and number of features they include continues to increase. The increase in complexity makes it difficult to place a number of rotary input locations that provide the user with visual cues for how to operate the device. Additionally, the size of the devices and of the displays for providing information and navigational cues to the user continues to decrease. The decrease in size makes it difficult or impossible to provide a virtual knob in the display to provide a visual cue.

Thus a need exists for providing a user with a visual cue for using a rotary input device in complex electronic devices.

SUMMARY

Embodiments of the present invention provide systems and methods for providing visual navigation cues in user interfaces for use with rotary input devices. One embodiment of the present invention implements a method comprising causing a plurality of graphical objects to be displayed in an arc. The curvature of the arc is configured to convey the ordinal relationship for navigating between each of the plurality of graphical objects with a rotary input device. The curvature of the arc can be based at least in part on the spatial relationship between the rotary input device and a display.

Further details and advantages of embodiments of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1A:
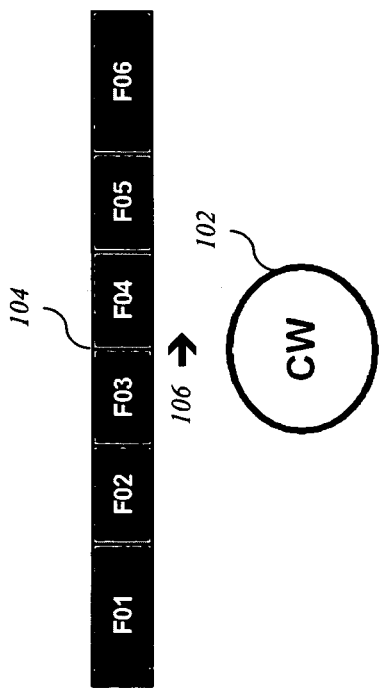
FIGS. 1A and 1B illustrate conventional horizontal displays and corresponding rotary inputs.
Figure 1B:
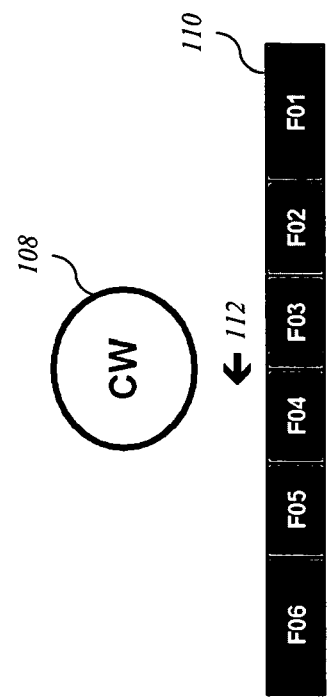

Referring now to the drawings in which like numerals indicate like elements throughout the several figures, FIGS. 1-4 illustrate conventional configurations of interface elements utilizing a rotary input device, such as a rotary switch. FIGS. 1A and 1B illustrate conventional horizontal displays and corresponding rotary inputs. Placement of the knob in relation to the display provides the user with a visual cue regarding movement of the knob in relation to progression through the displayed elements. By utilizing a rotary degree of freedom for control of the interaction with the display, the interface designer is requiring the user to recognize an ordinal relationship between the various elements displayed. In other words, when a user utilizes a rotary input device, the user moves through elements sequentially. In contrast, in a system utilizing a mouse or other pointing device, the user is able to navigate between the displayed elements without regard to order.

In the embodiment shown in FIG. 1A, an interface design includes a knob 102 located below a horizontal display 104. The horizontal display comprises multiple elements. Clockwise ("CW") rotation of the knob 102 results in movement from left to right along arrow 106. Receiving and interpreting the movement of a rotary device is well known to those of skill in the art and will therefore not be described in detail herein. The relationship between movement of the knob and navigation through the list is obvious to a user because of the position of the knob 102 relative to the horizontal display 104, i.e., the position of the knob 102 provides a visual cue to the user. In the embodiment shown in FIG. 1B, the interface includes a knob 108 located above a horizontal display 110. Clockwise rotation of the knob 108 results in movement from right to left along arrow 112. In the embodiment shown, counterclockwise rotation results in movement in the opposite direction (i.e., from left to right). This same behavior is exhibited in other exemplary embodiments described herein.

Figure 2A:
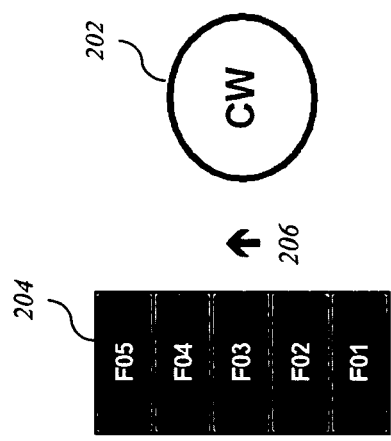
FIGS. 2A and 2B illustrate conventional vertical displays and corresponding rotary inputs.
Figure 2B:
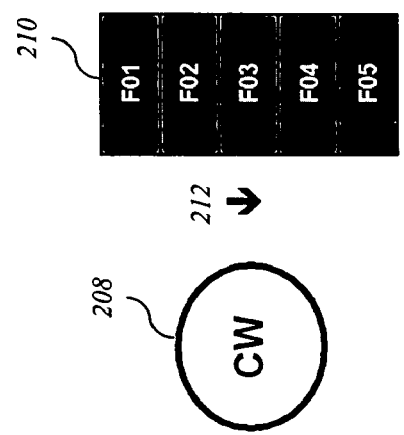

Arrangement of the knob with a corresponding vertical display can also provide a cue to a user as illustrated by the embodiments shown in FIGS. 2A and 2B. In FIG. 2A, the interface includes a knob 202 located to the right of a vertical display 204. Clockwise rotation of the knob results in movement from the bottom of the list of elements to the top along arrow 206. In the embodiment shown in FIG. 2B, a knob 208 is located to the left of a vertical display 210. Clockwise rotation of the knob 208 results in a top-to-bottom movement through the list along arrow 212.

Figure 3:
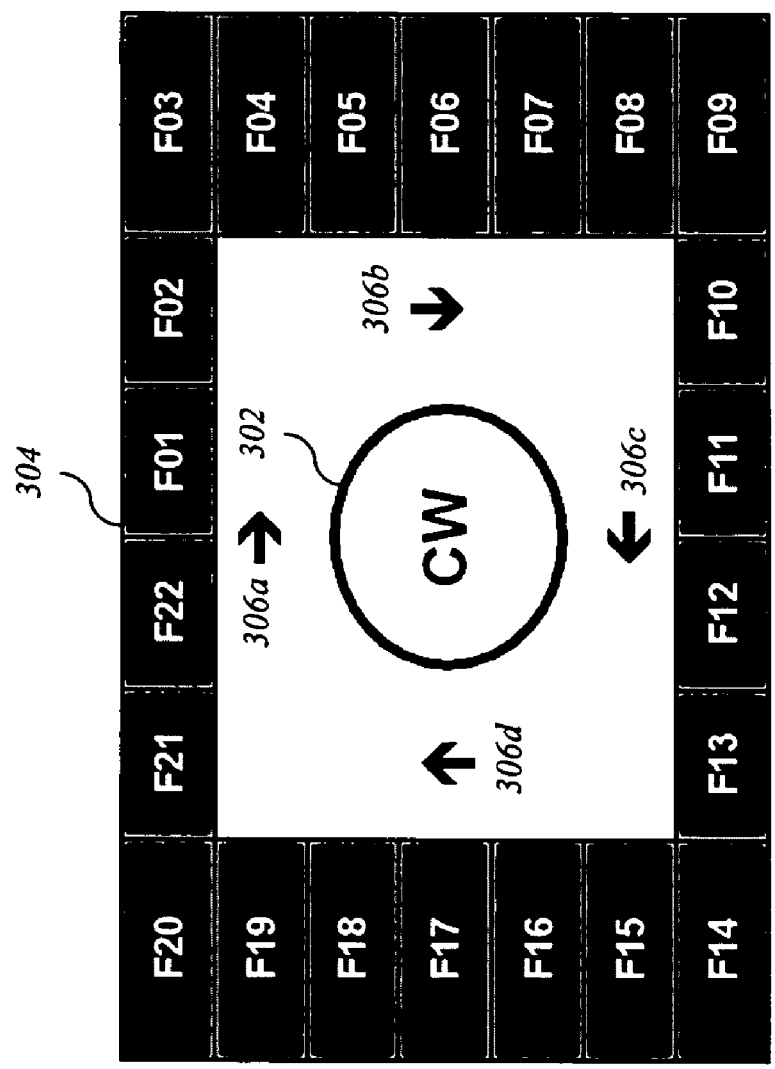
FIG. 3 illustrates another conventional display in which placement of the rotary input provides a visual cue to a user regarding navigation of a list of elements.

FIG. 3 illustrates another conventional interface in which placement of the rotary input provides a visual cue to a user regarding navigation of a list of elements. In the embodiment shown, a knob 302 is located in the middle of a square display 304. The square display 304 is equivalent to combining the vertical and horizontal displays illustrated in FIGS. 1 and 2. The list of elements is presented in a clockwise fashion around the knob 302. Clockwise rotation of the knob results in clockwise rotation through the elements presented in the display along arrows 306a-d.

Figure 4:
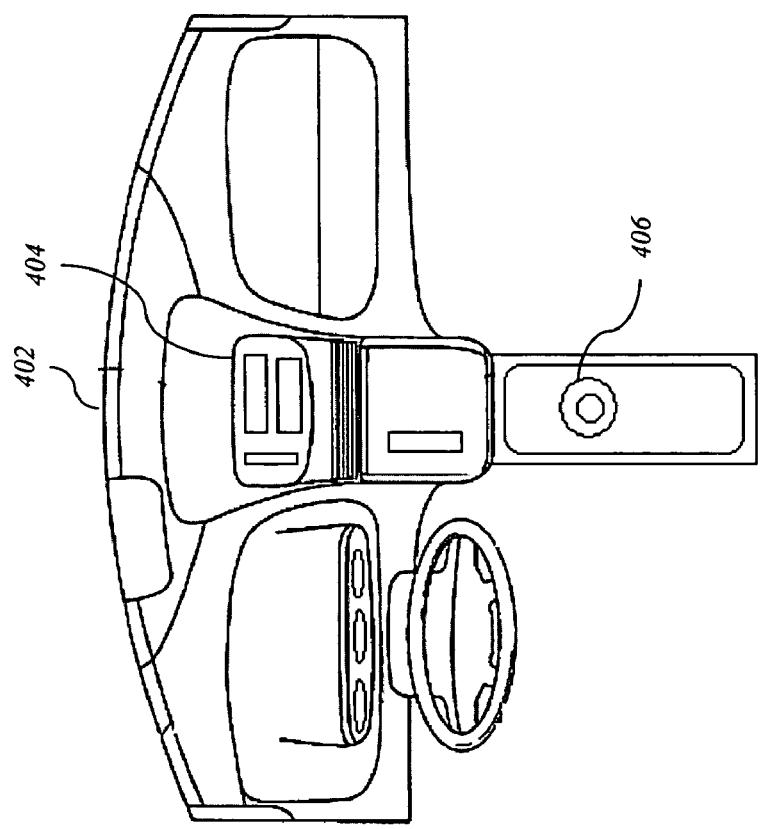
FIG. 4 is an illustration of an exemplary environment for one embodiment of the present invention in an automobile interior.

FIG. 4 is an illustration of an exemplary environment for one embodiment of the present invention in an automobile interior. The embodiment shown includes a dashboard 402. Installed in the dashboard is a display screen 404. Display screens such as the one shown have become common in automotive applications as the number and complexity of controls increase. In some implementations, a screen operates with a single device, such as the radio or the climate control system. In some embodiments, one screen performs the display function for several devices. In other embodiments, multiple screens may be used to display the same or similar information, either concurrently or at different times based on the combination of information a user requests to view. For example, navigation information may appear in the dashboard display screen 404 and on a heads up display projected on the windshield in front of the driver. Similar embodiments may be implemented in other applications, such as in airplane control systems.

The embodiment shown also includes a knob 406 linked to rotary input device (not shown) for navigating functions displayed on the display screen 404. The rotary input device may, for example, be an analog potentiometer, a simple rotary encoder, or may be a more complex device that has the capability to translate laterally, acting as a joystick, or to translate along the axis of rotation, providing the capability to push the knob down or pull the knob up. A knob including rotation, lateral, and translational degrees of freedom is described in U.S. application Ser. No. 09/783,936, filed Feb. 14, 2001, the entirety of which is incorporated herein by reference.

The embodiment shown also includes a processor (not shown) for receiving input signals from the knob (406) or from other input devices and for sending output signals to the display (404) or to other visual, audio, or haptic output devices. The knob (406), and corresponding rotary input device, or the display (404) may include an integrated processor, such as an Application Specific Integrated Circuit (ASIC). If so, this integrated processor may be utilized alone or in combination with another processor.

Alternatively, the processor may be separate from either device and may or may not be utilized by other systems. The processor may include, for example, digital logic processors capable of processing input, executing algorithms, and generating output as necessary in response to the inputs received from the knob (406) or from other input devices.

Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, and JavaScript.

In the embodiment shown, the knob 406 is located directly below the display screen 404. The diameter of the knob 406 is smaller than both the height and the width of the display 404. Accordingly, a vertical list of elements on the display 404 may be directly above the knob, to the right of the knob, or to the left of the knob 406. A vertical list of elements on the display 404 will be above the knob 406. The spatial relationship may or may not provide a cue to the user at to how to navigate the list of elements using the knob 406. For example, if a vertical list of elements is presented directly above the knob, the user may be unsure as to which direction to turn the knob 406 to move in the desired direction. Also, the vertical list of elements may be presented in multiple displays, further complicating the user's task of determining in which direction to turn the knob 406.

Figure 5:
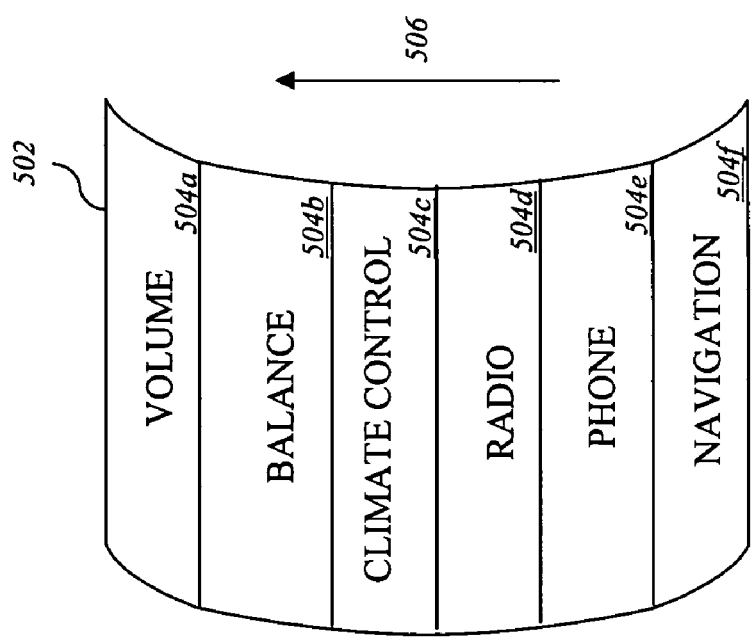
FIG. 5 is an illustration of a menu for accessing functions of electronic devices in an automobile in one embodiment of the present invention.

FIG. 5 is an illustration of a menu for accessing functions of electronic devices in an automobile in one embodiment of the present invention. In the embodiment shown, the menu 502 is displayed on the display (402) directly above the knob (406). The menu 502 includes a plurality of menu options 504a-f. In a conventional system in which the menu is not curved, the direction in which the knob is turned to move from one menu option to the next is ambiguous because the menu display does not provide a visual cue to the user. However, in the embodiment shown, the curvature of the graphical display provide a visual cue to the user that clockwise rotation of the knob (406) results in movement from the bottom of the list of menu option to the top along arrow 506.

Figure 6:
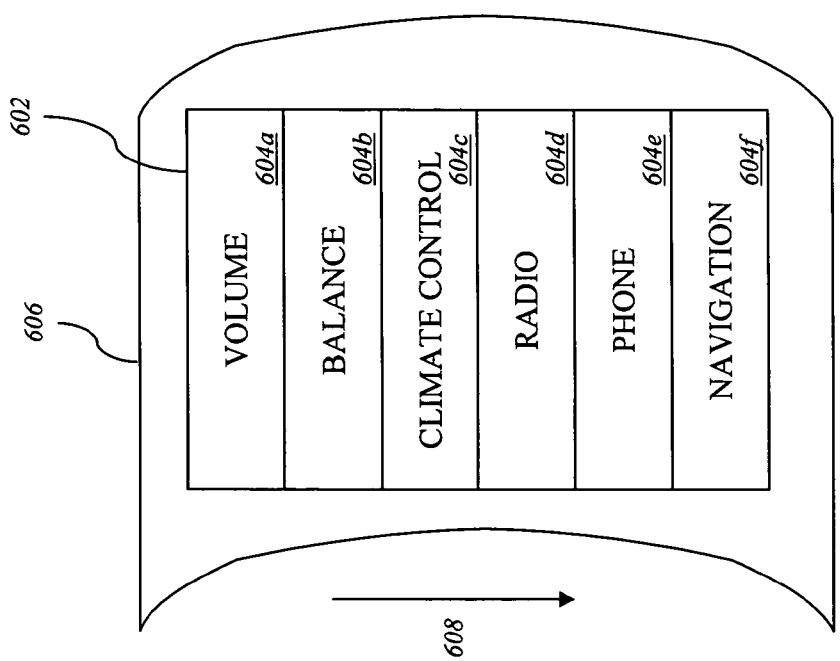
FIG. 6 is an illustration of another embodiment of the present invention for displaying the menu shown in FIG. 5.

FIG. 6 is an illustration of another embodiment of the present invention for displaying a menu comprising the menu items shown in FIG. 5. In the embodiment shown, the display (404) displays a menu 602. The menu 602 includes a list of elements 604a-f. The menu 602 has the shape of a rectangle, having the list of elements 604a-f displayed vertically. To provide a visual cue to aid the user, the embodiment shown includes a curved enclosure 606 around the menu 604. Based on the curvature of the enclosure 606, it is obvious to a user that clockwise rotation of the knob (406) will result in movement from top to bottom through the list of elements 604a-f along arrow 608. An embodiment such as the one shown is relatively simple to implement. It also can be used with existing systems with minimal changes to the code for creating, displaying, and navigating the menu 604.

Figure 7:
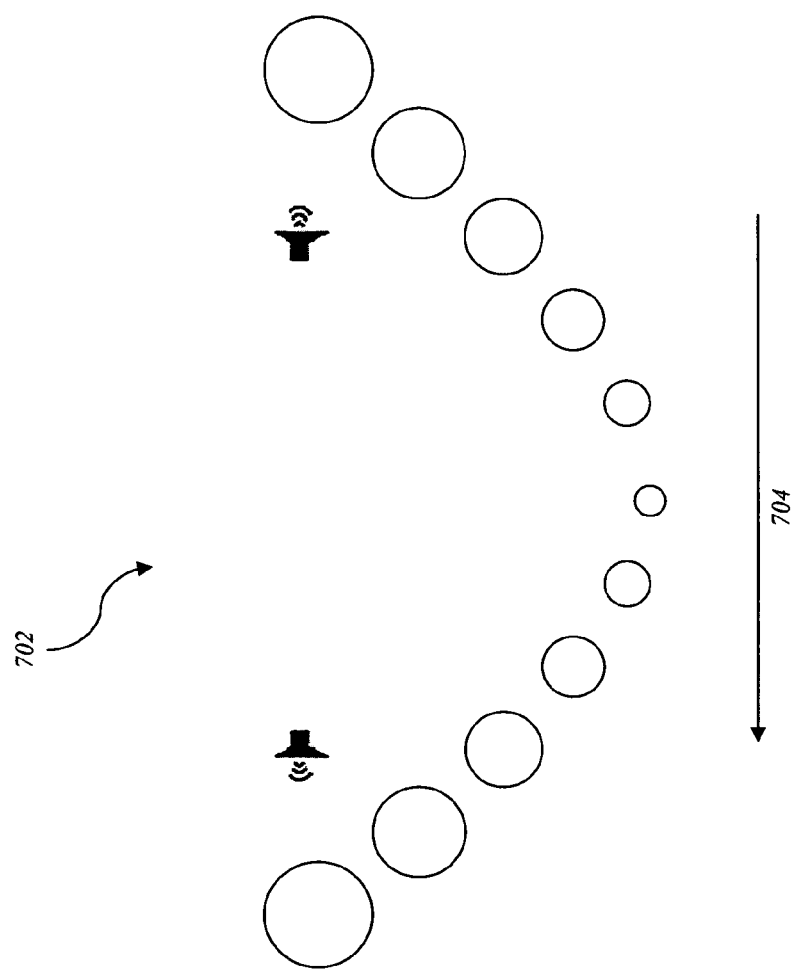
FIG. 7 is an illustration of a radio balance control representation in one embodiment of the present invention.

FIG. 7 is an illustration of a radio balance control representation in one embodiment of the present invention. In the embodiment shown, the graphical elements of the balance representation 702 are arranged in a curve, providing a visual cue to the user. Clockwise rotation of the knob (406) results in right to left movement between the various elements of the representation 702 along arrow 704. The embodiment shown in FIG. 7 illustrates that the representation may comprise a plurality of elements arranged in a curve. The embodiment shown includes no outline, and the elements are not contiguous.

The embodiment shown in FIG. 7 may be implemented in the automobile environment shown in FIG. 4. In such an environment, the balance representation 702 appears on the display (404) above the control knob (406). In such an embodiment, the user would typically expect to turn the knob (406) clockwise to increase the volume of the right side speaker(s) while simultaneously decreasing the volume of the left side speaker(s). However, the visual cue provided by the arc instructs the user to instead turn the knob (406) counter-clockwise to increase the volume of the right side speaker(s).

Figure 8:
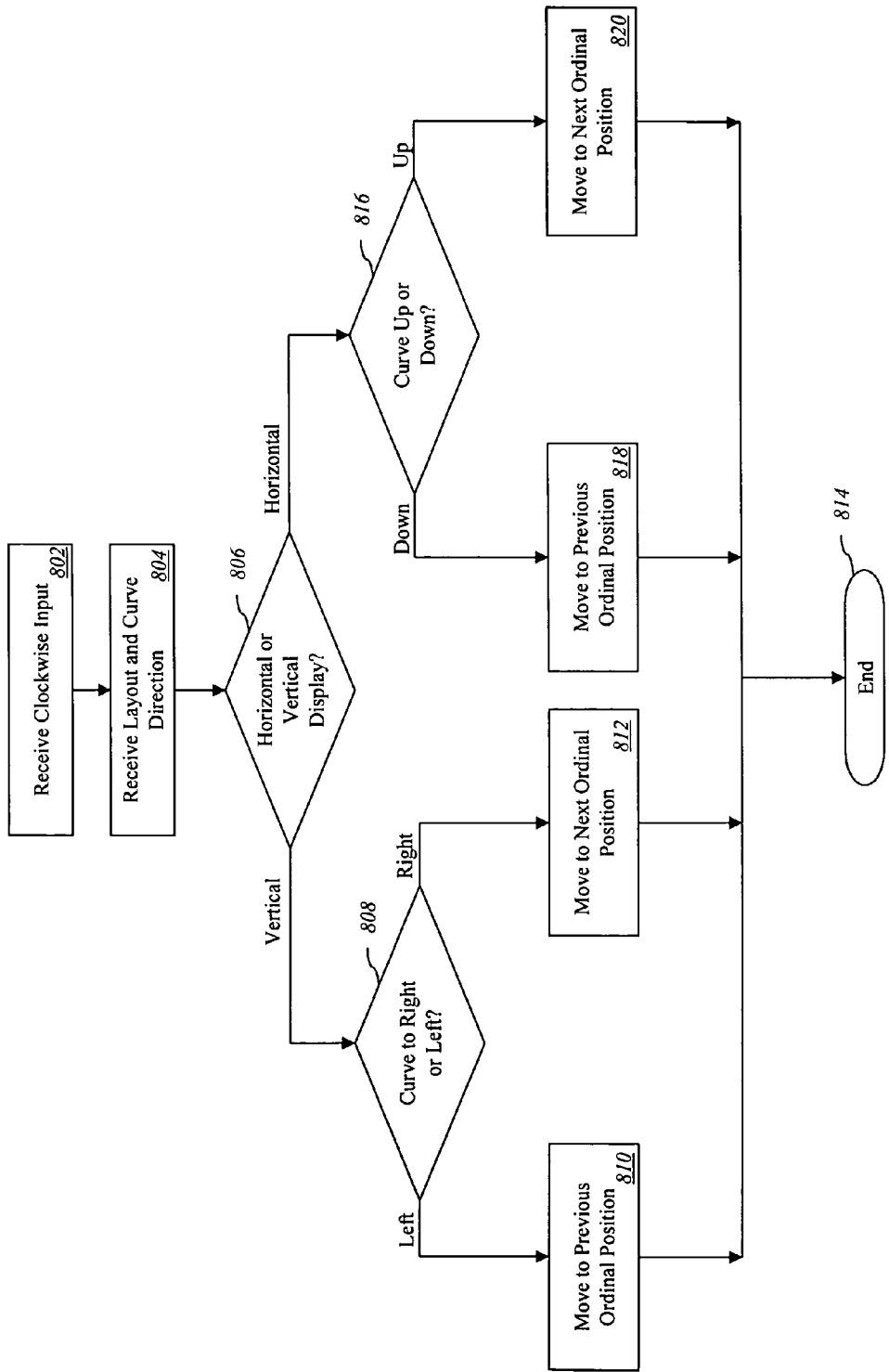
FIG. 8 is a flowchart, illustrating a process for navigating a list in one embodiment of the present invention.

FIG. 8 is a flowchart, illustrating a process for navigating a list in one embodiment of the present invention. The process may be implemented via processor-executable code stored in a computer-readable medium. In the embodiment shown, the processor first receives clockwise input from the rotary device 802. The clockwise input may be in the form of a change in resistance from a potentiometer, quadrature or binary (gray) coded output from a rotary encoder, or some other type of input provided by the rotary device. The processor then receives the layout and the direction of the curve 804. In the embodiment shown, the layout information includes whether the list of elements is presented in a horizontal or vertical fashion and in what direction the display curves. The processor evaluates this information to determine if the element list is presented horizontally or vertically 806.

If presented vertically, the processor next determines whether the list of elements curves to the right (i.e., having the ends located to the left relative to the middle) or to the left (i.e., having the ends located to the right relative to the middle) based on the layout information. If the list of elements curves to the left and assuming that the list is ordered from top to bottom, the processor decrements or moves to the previous ordinal position in the list 810. The processor may perform additional steps after detecting a movement, such as displaying an undisplayed element when the rotary input device is turned beyond the first or last element displayed; this may be referred to as "scrolling the list." Once the steps shown are complete, the process ends until additional input is received 814. If the curve of a vertical list is to the right, the processor increments or moves to the next ordinal position 812.

If the list of elements is presented horizontally, the processor determines whether the list of elements curves up (i.e., having the ends located relatively lower relative to the middle) or down (i.e., having the ends located relatively higher relative to the middle) in the display 816. If the list elements are ordered left-to-right and the display curves down towards the bottom of the screen, then the processor decrements or moves to the previous ordinal position within the list of elements 818. If the display curves up, the processor increments or moves to the next ordinal position within the list of elements.

Figure 9:
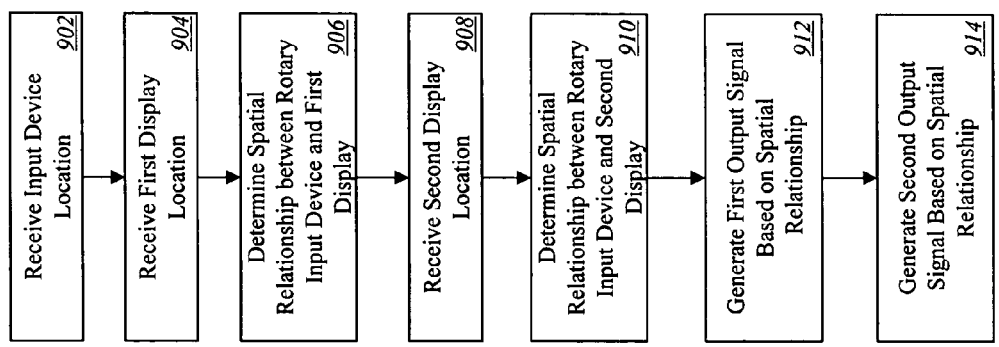
FIG. 9 is a flowchart, illustrating the process of generating an output signal for each of two displays in one embodiment of the present invention.

One embodiment of the present invention varies the curvature of the arc based at least in part on the spatial relationship between the knob (406) and a display, such as the display (402). In one such embodiment in which two displays are utilized for displaying a list of elements, the curvature of the arc in which the list of elements is displayed may vary between the two displays if the spatial relationship between each of the displays and the rotary input device varies. FIG. 9 is a flowchart illustrating the process of generating output signals in one such embodiment of the present invention. In the embodiment shown, a list of elements is to be displayed on two displays approximately simultaneously. The processor receives an input signal indicating the position of the input device 902. The processor also receives the position of the first display 904. Based on the two positions, the processor determines the spatial relationship between the rotary input device and the first display 906. For example, the spatial relationship may indicate that the display is above and to the right of the center of the knob. In other embodiments, the processor receives an input signal that indicates the spatial relationship between the display and the rotary input device and does not determine the relationship based on the location inputs. The processor also receives the location of the second display 908 and determines the spatial relationship between the rotary input device and the second display 910.

The processor generates a first output signal based on the spatial relationship between the input device and the first display 912. The processor also generates a second output signal based on the spatial relationship between the input device and the second display 914. For example, in one embodiment, the first display is directly above the center of the input device, and the second display is to the left of the input device. The processor determines that the curve of the arc should be to the left and generates an output signal for both displays that causes the display to curve the arc to the left. Typically, the curves of the arcs on multiple displays will be in the same direction to minimize confusion of the user.

In the embodiment described in relation to FIG. 9, the two displays generated to display the same list. In another embodiment, two separate lists or menus are generated. The user interacts with one of these two lists, and then switches to the other list by, for example, selecting an option on the first list. The user may further select an option on the second list to return to the first list. The menus may be curved based on a spatial relationship with the knob or may not be; the curve of the display provides the visual cue to the user regardless of the spatial relationship between the knob and the display. Also, the menus may have different orientations from one another (e.g., one vertical and one horizontal) and may be curved differently (e.g., one to the right and one to the left). An embodiment may include more than two menus.

An embodiment of the present invention may be implemented in any interface utilizing a rotary input. Several of the embodiments described herein have been described in relation to an automobile. Airplanes, marine vessels, and other forms of transportation would benefit from similar embodiments. In addition, rotary inputs are common in portable electronic devices, such as cell phones, personal digital assistants, radios, MP3 players, digital cameras, and other similar devices. An embodiment of the present invention may also be utilized in power control applications.

An embodiment of the present invention may also be implemented in a personal computer interface. For example, many users of home computers utilize audio and video editing applications. Many of these applications include interfaces utilizing rotary input, such as varying settings on an appliance, such as volume control, color saturation, navigation within a song or film, and various other features.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed is:

1. A method comprising:
    receiving a first signal comprising information describing a plurality of graphical objects to be displayed and an orientation of the plurality of graphical objects;
    receiving a second signal comprising a position of a rotary input device;
    determining a curvature of an arc based at least in part on the orientation of the plurality of graphical objects and the position of the rotary input device;
    transmitting a signal comprising the arc and the information describing the plurality of graphical objects.

2. The method of claim 1, wherein the orientation comprises a vertical orientation.

3. The method of claim 1, wherein the orientation comprises a horizontal orientation.

4. A computer-readable medium on which is encoded processor-executable program code, comprising:
    program code for receiving a first signal comprising information describing a plurality of graphical objects to be displayed and an orientation of the plurality of graphical objects;
    program code for receiving a second signal comprising a position of a rotary input device;
    program code for determining a curvature of an arc based at least in part on the orientation of the plurality of graphical objects and the position of the rotary input device;
    program code for transmitting a signal comprising the arc and the information describing the plurality of graphical objects.

5. The computer-readable medium of claim 4, wherein the orientation comprises a vertical orientation.

6. The computer-readable medium of claim 4, wherein the orientation comprises a horizontal orientation.

* * * * *